United States Patent
Kher et al.

(10) Patent No.: US 12,355,616 B2
(45) Date of Patent: Jul. 8, 2025

(54) UPDATING CONFIGURATION OF CELLULAR TELECOMMUNICATION NETWORK COMPONENTS

(71) Applicant: DISH WIRELESS L.L.C., Englewood, CO (US)

(72) Inventors: Pradipbhai Kher, Dublin, OH (US); Christopher Ivin, Powell, OH (US)

(73) Assignee: DISH Wireless L.L.C., Englewood, CO (US)

( * ) Notice: Subject to any disclaimer, the term of this patent is extended or adjusted under 35 U.S.C. 154(b) by 448 days.

(21) Appl. No.: 17/981,294

(22) Filed: Nov. 4, 2022

(65) Prior Publication Data
US 2024/0154859 A1    May 9, 2024

(51) Int. Cl.
H04W 48/18      (2009.01)
H04L 41/08      (2022.01)
H04L 41/0803    (2022.01)
H04L 41/22      (2022.01)

(52) U.S. Cl.
CPC ...... *H04L 41/0803* (2013.01); *H04L 41/0883* (2013.01); *H04L 41/22* (2013.01)

(58) Field of Classification Search
CPC ... H04L 65/403; H04L 67/10; H04L 41/0803; H04L 41/0883; H04L 4/22; H04W 76/007; H04M 11/04; G08B 25/016; G06Q 30/0601
See application file for complete search history.

(56) References Cited

U.S. PATENT DOCUMENTS

| | | | |
|---|---|---|---|
| 2009/0083589 A1* | 3/2009 | Fulton | G05B 19/05 714/48 |
| 2018/0152564 A1* | 5/2018 | Lang | H04M 15/00 |

* cited by examiner

*Primary Examiner* — Phuoc H Doan
(74) *Attorney, Agent, or Firm* — Jeremiah J. Baunach; Frontier IP Law PLLC

(57) ABSTRACT

A system for updating configuration of cellular telecommunication network components is vendor agnostic (i.e., supports multiple file formats and data modeling languages that may be used by various different OpenRan vendors). The system may include a single central unifying tool that removes dependence on different OpenRan vendor toolsets, enables the mobile network operator (MNO) to customize views and to add custom mapping and features, enables multiple file loading and provides a viewing tree structure for network components and parameters in a GUI. The system enables an MNO optimization engineer to make single or bulk parameter changes for multiple different network components, provides export and import options for electronic spreadsheet interaction, creates updated XML files and a listing of changes of network component parameters for tracking purposes, and provides parsing algorithms to support future software updates that introduce new network objects and features.

20 Claims, 11 Drawing Sheets

FIG. 4B

UPDATING CONFIGURATION OF CELLULAR TELECOMMUNICATION NETWORK COMPONENTS

BRIEF SUMMARY

In various embodiments, a plurality of cellular telecommunication network components, including various network functions, may have configurations that need to be updated as part of the operation of the network and also as the network changes (e.g., as network components are added or removed). However, such network components may be maintained, supported and/or provided by various different vendors or manufacturers of network equipment which may use different file formats and methods of defining and identifying network component parameters. Thus, it is advantageous to have efficient techniques and processes as described herein for updating configuration of cellular telecommunication network components in a cellular telecommunication network. It is with respect to these and other considerations that the embodiments described herein have been made.

Fifth-generation wireless (5G) technology provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them. This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power is better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

Embodiments, described herein may use containerization to implement such microservices and network functions, referred to as containerized network functions (CNFs). Containerization is the packaging of software code with just the operating system (OS) libraries and dependencies required to run the code to create a single lightweight executable (a container) that runs consistently on any infrastructure. Software platforms, such as Kubernetes, manage containerized workloads and automate the deployment, scaling, and management of containerized applications. Compared to virtual machines (VMs) containers have relaxed isolation properties to share the Operating System (OS) among the applications. Therefore, containers are considered lightweight. A container has its own file system, share of CPU, memory and process space. As they are decoupled from the underlying infrastructure, they are portable across clouds and OS distributions. As disclosed herein, Such CNFs of the 5G NR cellular telecommunication network may be hosted on a cloud service provider cloud and referred to herein as cloud-native network functions.

Briefly described, embodiments disclosed herein are directed to a system that is vendor agnostic (i.e., supports multiple file formats and data modeling languages that may be used by various different Open RAN (i.e., OpenRan or ORAN) vendors. In an example embodiment, the system includes a single central unifying tool that removes dependence on different ORAN vendor toolsets, enables the mobile network operator (MNO) to customize views and to add custom mapping (e.g., cell site to gNb) and features, enables multiple file loading and provides a viewing tree structure for network components and parameters in a graphical user interface (GUI). The system enables an MNO optimization engineer to make single or bulk parameter changes for multiple different network components, provides export and import options for electronic spreadsheet (e.g., MS Excel®) interaction, creates updated XML files and a listing of changes of network component parameters for tracking purposes, and provides parsing algorithms to easily support future software updates that introduce new network objects and features.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 4B is a second portion of an example GUI screen of FIG. 4A displaying editable parameter values for a plurality of network components in accordance with embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems, networks and databases, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
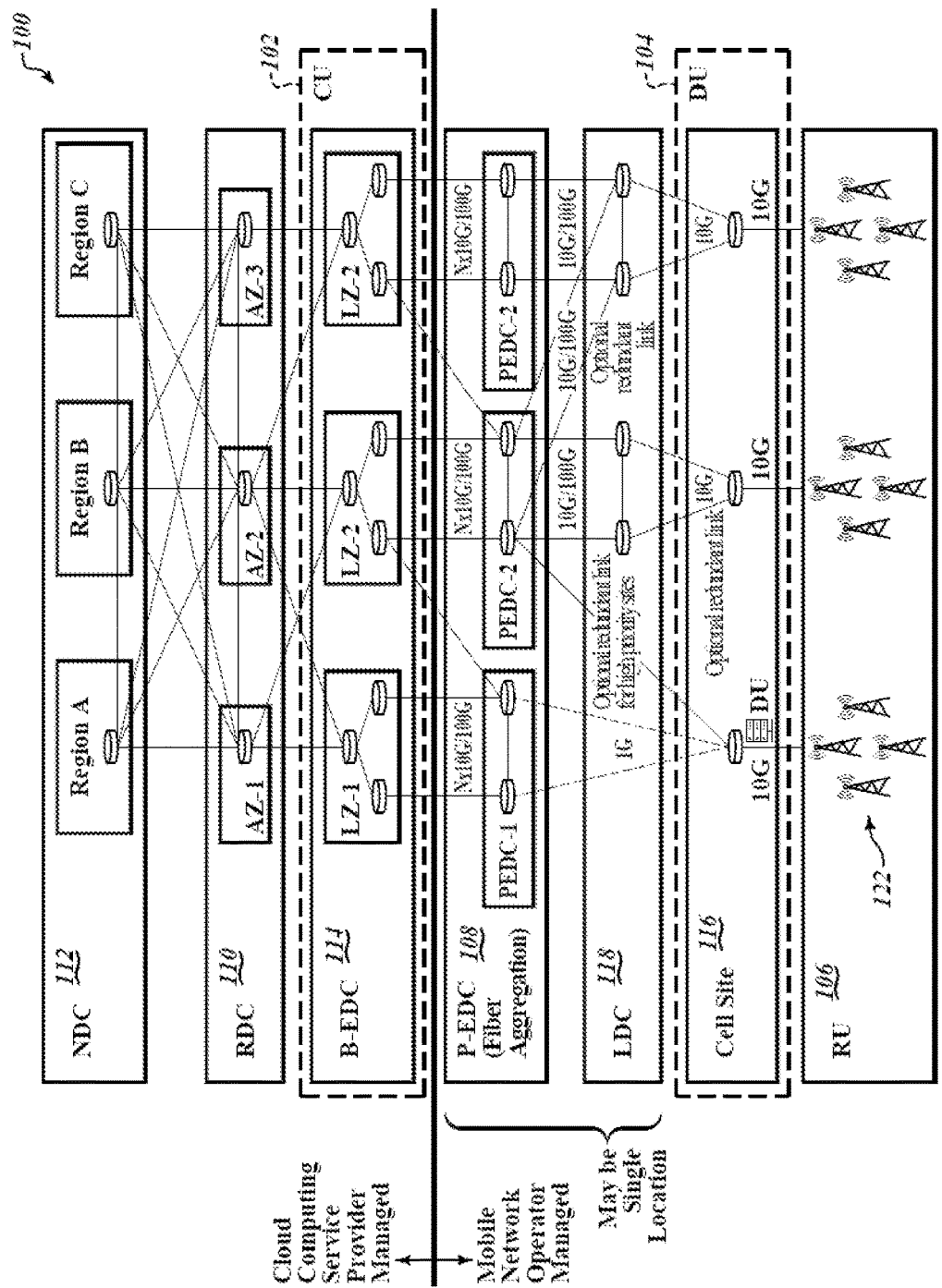
FIG. 1 illustrates a diagram of an example system architecture overview of a cellular telecommunication network for which updating configuration of cellular telecommunication network components may be performed in accordance with embodiments described herein.

FIG. 1 illustrates a diagram of an example system architecture overview of a cellular telecommunication network 100 for which updating configuration of cellular telecommunication network components may be performed in accordance with embodiments described herein.

The system 100 illustrates an example architecture of at least one wireless network of a mobile network operator (MNO) that is operated and/or controlled by the MNO. The system may comprise a 5G wireless cellular telecommunication network including a disaggregated, flexible and virtual RAN with interfaces creating additional data access points and that is not constrained by base station proximity or complex infrastructure. As shown in FIG. 1, a 5G RAN is split into DUs (e.g., DU 104) that manage scheduling of all the users and a CU 102 that manages the mobility and radio resource control (RRC) state for all the UEs. The RRC is a layer within the 5G NR protocol stack. The CU 102 is hosted within one or more local zones of the cloud computing service provider. For example, local zone 1 (LZ-1) 124. A local zone is a type of infrastructure deployment of the cloud computing service provider that places compute, storage, database, and/or other select cloud computing services closer to end users of the services and systems hosted by cloud computing service provider (e.g., closer to large population and industry centers). Local zones enable users of the cloud computing service provider cloud to use select cloud computing services, like compute and storage services, closer to more end-users, providing them very low latency access to the applications running locally. Local Zones are also connected to the parent region (e.g., Region A, Region B and/or Region C shown in FIG. 1) via the cloud service provider's redundant and very high bandwidth private network, giving applications running in local zones fast, secure, and seamless access to the rest of the cloud computing services.

As shown in FIG. 1, the radio unit (RU) 106 converts radio signals sent to and from the antenna of base stations 122 (also referred to as base transceiver stations (BTS)) into a digital signal for transmission over packet networks. It handles the digital front end (DFE) and the lower physical (PHY) layer, as well as the digital beamforming functionality.

The DU 104 may sit close to the RU 106 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNb functions, depending on the functional split option, and its operation is controlled by the CU 102.

The CU 102 is the centralized unit that runs the RRC and Packet Data Convergence Protocol (PDCP) layers. A gNb may comprise a CU and one DU connected to the CU via Fs-C and Fs-U interfaces for control plane (CP) and user plane (UP) respectively. A CU with multiple DUs will support multiple gNbs. The split architecture enables a 5G network to utilize different distribution of protocol stacks between CU 102 and DU 104 depending on midhaul availability and network design. The CU 102 is a logical node that includes the gNb functions like transfer of user data, mobility control, RAN sharing, positioning, session management etc., with the exception of functions that may be allocated exclusively to the DU 104. The CU 102 controls the operation of several DUs 104 over the midhaul interface.

As mentioned above, 5G network functionality is split into two functional units: the DU 104, responsible for real time 5G layer 1 (L1) and 5G layer 2 (L2) scheduling functions, and the CU 102 responsible for non-real time, higher L2 and 5G layer 3 (L3). As shown in FIG. 1, the DU's server and relevant software may be hosted on a cellular (cell) site 116 itself or can be hosted in an edge cloud (local data center (LDC) 118 or central office) depending on transport availability and fronthaul interface. DUs from multiple cell sites may be pooled and col-located at one LDC 118. The CU's server and relevant software may be hosted in a regional cloud data center or, as shown in FIG. 1, in a breakout edge data center (B-EDC) 114. As shown in FIG. 1, the DU 104 may be provisioned to communicate via a pass-through edge data center (P-EDC) 108. The P-EDC 108 may provide a direct circuit fiber connection from the DU directly to the primary physical data center (e.g., B-EDC 114) hosting the CU 102. In some embodiments, the LDC 118, P-EDC 108 and/or the B-EDC 114 may be co-located or in a single location. The CU 102 may be connected to a regional cloud data center (RDC) 110, which in turn may be connected to a national cloud data center (NDC) 112. In the example embodiment, the P-EDC 108, the LDC 118, the cell site 116 and the RU 106 may all be managed and/or controlled by the mobile network operator and the B-EDC 114, the RDC 110 and the NDC 112 may all be managed and/or hosted by a cloud computing service provider. In some embodiments, the P-EDC 108, LDC 118 and cell site 116 may be at a single location or facility (e.g., a colocation data center). In other embodiments, the B-EDC 114, the P-EDC 108, the LDC 118 and cell site 116 may be at a single location or facility (e.g., a colocation data center). According to various embodiments, the actual split between DU and RU may be different depending on the specific use-case and implementation.

In various embodiments, a plurality of cellular telecommunication network components, including various network functions, such as those described above and others, may have configurations that need to be updated as part of the operation of the network 100 and as the network 100 changes (e.g., as network components are added or removed). However, such network components may be maintained, supported and/or provided by various different vendors or manufacturers of network equipment which may use different file formats and methods of defining network component parameters. Thus, it is advantageous to have efficient techniques and processes as described herein for updating configuration of cellular telecommunication network components in a cellular telecommunication network, such as cellular telecommunication network 100.

Figure 2:
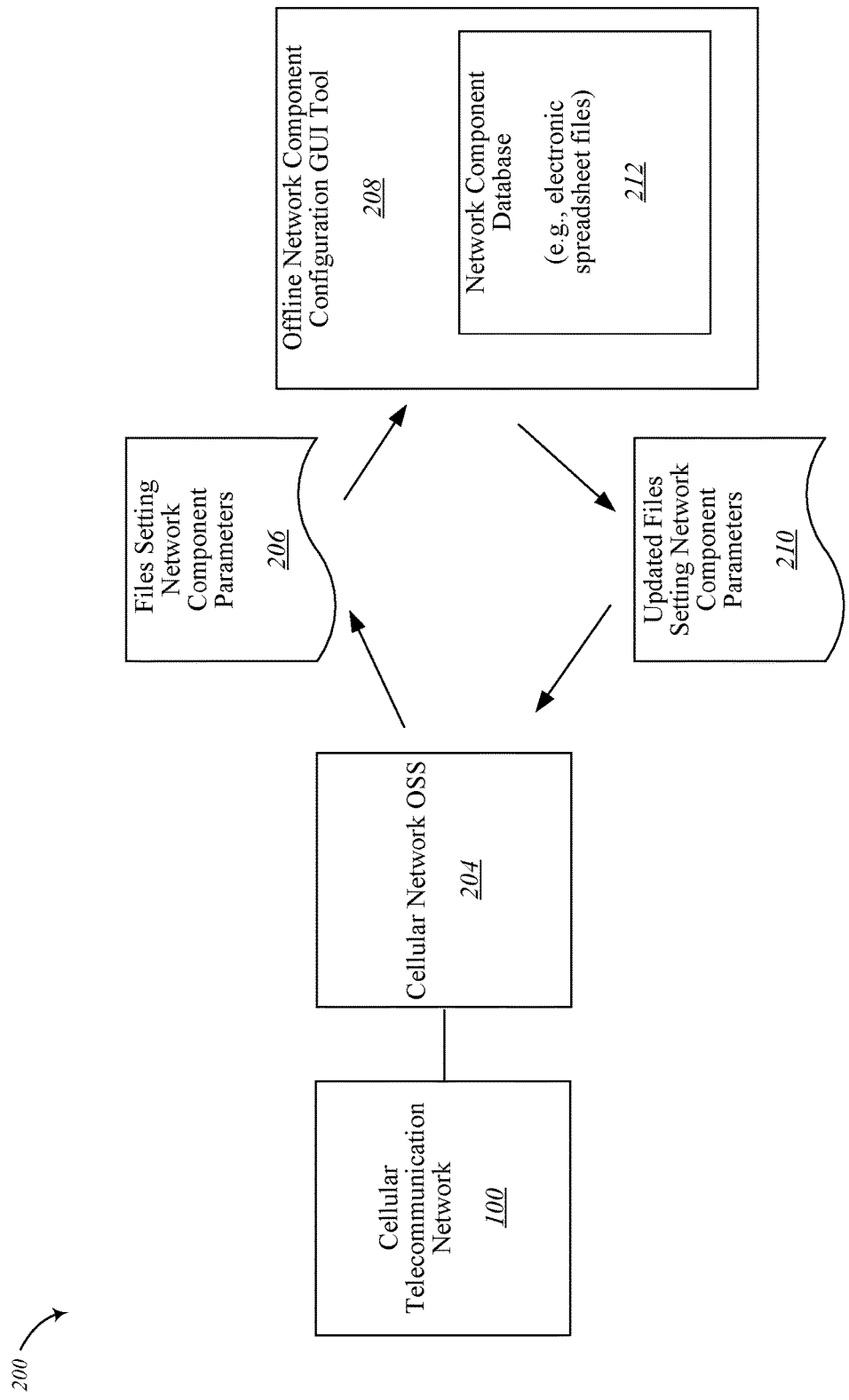
FIG. 2 is a block diagram of a system for updating configuration of cellular telecommunication network components in accordance with embodiments described herein.

FIG. 2 is a block diagram of a system 200 for updating configuration of cellular telecommunication network components in accordance with embodiments described herein.

The system 200 of FIG. 2 comprises an OpenRan provisioning solution (OPS) that includes an offline network component configuration GUI tool 208. In an example embodiment, the offline network component configuration GUI tool 208 may be an offline desktop application that may be used for reconfiguration of existing DU/CU configurations and enables MNO optimization engineers to make single or bulk parameter changes to cellular telecommunication network components.

ORAN vendor CNFs are used for the virtualization of the BTS RAN processing. These CNFs may follow BTS technologies that use electronic files setting network component parameters 206 for a plurality of cellular telecommunication network components of cellular telecommunication network 100. The electronic files setting network component parameters 206 may use configuration formats such as those based on the Yet Another Next Generation (YANG) data modeling language. The YANG data modeling language can be used to model both configuration data as well as state data of network components. The language, being protocol independent, can then be converted into any encoding format, e.g., Extensible Markup Language (XML) or JavaScript Object Notation (JSON), that the network configuration protocol supports. However, other data modeling languages and formats may be used in various embodiments. However, making changes manually in each of the electronic files setting network component parameters 206, which may each be in different YANG formats for different ORAN vendors, and for vast numbers of network components, is inefficient, prone to error and time consuming.

To address the above problem, the system 200 is vendor agnostic (i.e., supports multiple file formats and data modeling languages that may be used by various different ORAN vendors). In an example embodiment, the system 200 includes a single central unifying tool (offline network component configuration GUI tool 208) that removes dependence on different ORAN vendor toolsets, enables the mobile network operator (MNO) to customize views and to add custom mapping (e.g., cell site to gNb) and features, enables multiple file loading and provides a viewing tree structure for network components and parameters in a GUI. The system 200 enables an MNO optimization engineer to make single or bulk parameter changes for multiple different network components, provides export and import options for electronic spreadsheet (e.g., MS Excel®) interaction, creates updated XML files and a listing of changes of network component parameters for tracking purposes, and provides parsing algorithms to easily support future software updates that introduce new network objects and features.

In an example embodiment, the offline network component configuration GUI tool 208 may interface with the cellular network operational support system OSS, which is a software component in operational communication with the cellular telecommunication network 100 and enables the MNO to monitor, control, analyze, and manage its the cellular telecommunication network 100. The offline network component configuration GUI tool 208 may receive the files setting network component parameters 206 for the network 100 via the OSS 204. The offline network component configuration GUI tool 208 may then import those files setting network component parameters 206. For example, the offline network component configuration GUI tool 208 may detect which format and/or data modeling language each file uses to set network component parameters and parse each file accordingly to extract from the file, network objects defined in the file representing cellular telecommunication network components. The offline network component configuration GUI tool 208 may also electronically parse of the files setting network component parameters 206 to extract, from the file, parameters and corresponding parameter values associated with each of the extracted network objects. The offline network component configuration GUI tool 208 may then electronically organize and copy the extracted network objects and corresponding parameters into a cellular telecommunication network component database 212 (e.g., such as into one or more corresponding electronic spreadsheets. This may be performed in a manner that associates the objects and parameters with each other in the network component database 212 to build or represent a hierarchical tree structure as indicated by the corresponding files setting network component parameters 206. The offline network component configuration GUI tool 208 may then query the database 212 to electronically generate the list of cellular telecommunication network components of different types to display visually in a tree structure within a GUI.

In an example embodiment, a user of the offline network component configuration GUI tool 208 may then navigate the tree structure and select via the GUI particular network objects within the tree structure representing multiple network components for which the user would like to update parameter values. The offline network component configuration GUI tool 208 may list in a column or row a plurality of parameter values for the same parameter associated with multiple different network components based on the selection made by the user form the tree structure. The offline network component configuration GUI tool 208 then enables the user to update all of the parameter values of that same parameter for the multiple different network components at once or in bulk (e.g., via copying and pasting a parameter value by a mouse or keyboard into the applicable column or row). Such updates are stored in the network component database 212.

In an example embodiment, the offline network component configuration GUI tool 208 may then updates the files setting network component parameters 206, thereby generating updated files setting network component parameters 210 according to the updates to the parameter values made by the user via the GUI. These updates are made in accordance with the particular different formats and data modeling languages used by each of the files setting network component parameters 206. The offline network component configuration GUI tool 208 may then push or otherwise input these updated files setting network component parameters 210 to the OSS 204 in order to cause a configuration of the plurality of cellular telecommunication network components to be updated in the network 100 according to the updates to the parameter values made by the user via the GUI.

Figure 3:
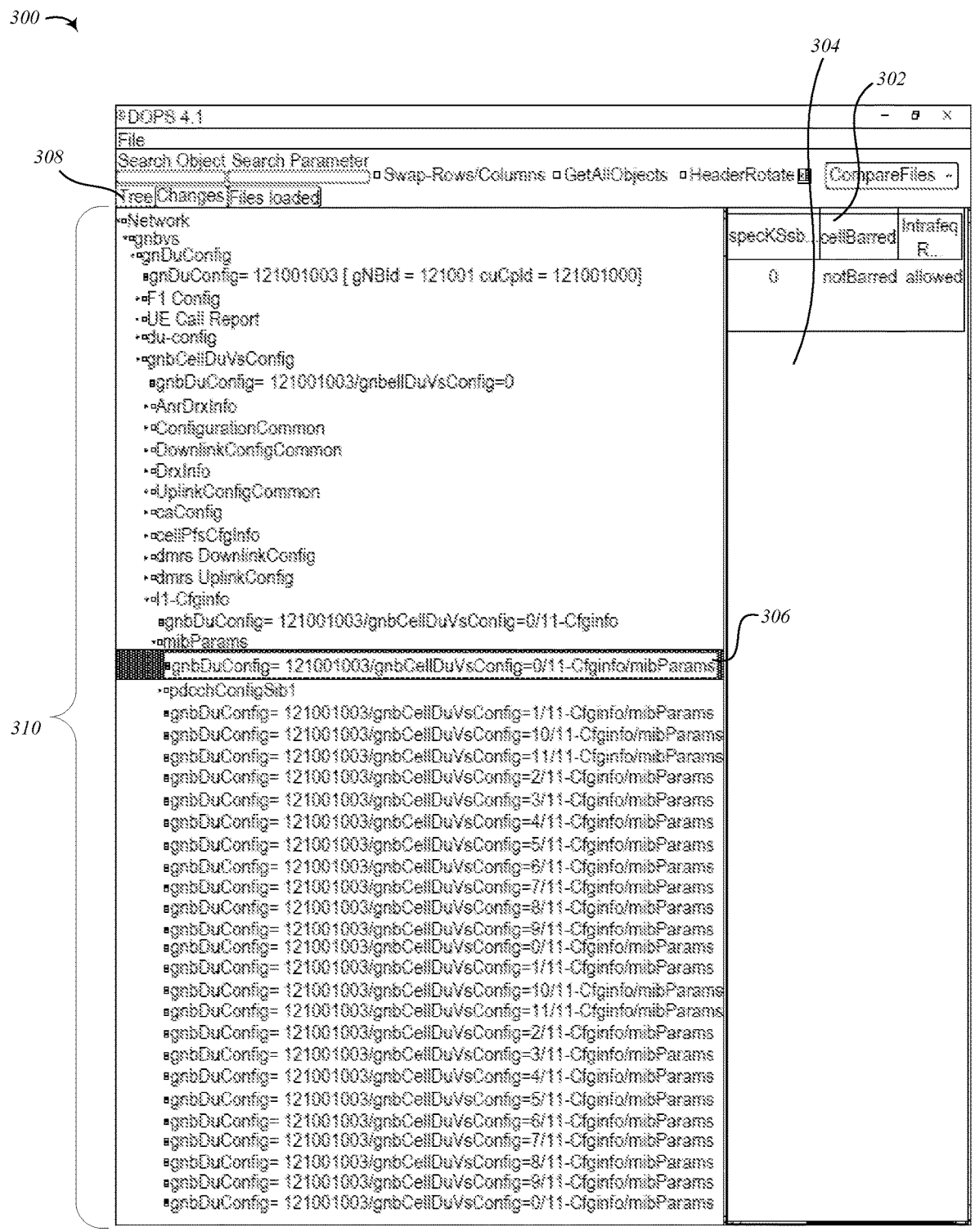
FIG. 3 is an example GUI screen of a system for updating configuration of cellular telecommunication network components displaying a tree structure of network components in accordance with embodiments described herein.

FIG. 3 is an example GUI screen 300 of the system 200 for updating configuration of cellular telecommunication network components displaying a tree structure of network components in accordance with embodiments described herein. For example, the GUI screen 300 may be that provided by the offline network component configuration GUI tool 208 of FIG. 2. FIGS. 3-5 show a sequence of GUIs presented by the offline network component configuration GUI tool 208 in an example of changing a single vendor parameter for a cluster of cell sites. In the present example, it is the "CellBarred" parameter that is being updated. The "CellBarred" parameter is used to block (bar) access to cell site service for customers, but allows access for MNO dedicated test user equipment (UE) subscriber identity module (SIM) cards. This parameter is a common parameter used to launch new cell sites, where the configuration needs to be tested by engineering teams to confirm correct operation before they allow any commercial uses to access the site service. The cell site is left in a "barred" state until testing is complete, at which time the cell site or cluster of cell sites will have this parameter value set to "unbarred" which would then allow commercial traffic, all customers to access.

Shown is a tab 308 which, when selected, causes the tree structure 310 for network components and parameters of network 100 to be displayed. In the present example, the user has navigated the tree structure 310 and selected network component 306, which in the present example is the parent object that the "CellBarred" parameter is a child of. In response to the selection, the properties 302 of the "CellBarred" parameter may then be listed in a second window 304 to the right of the tree structure 310.

Figure 4A:
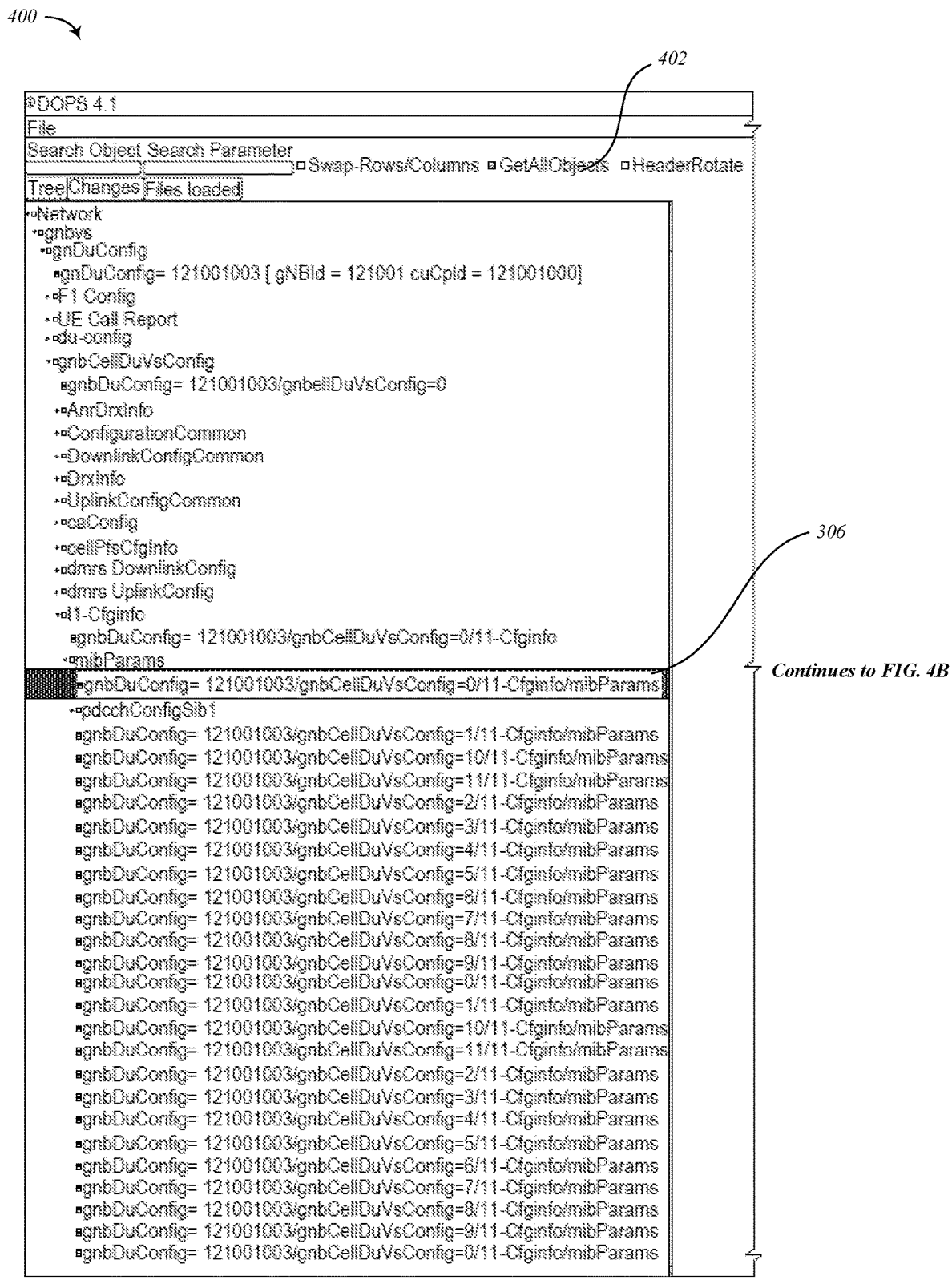
FIG. 4A is a first portion of an example GUI screen of a system for updating configuration of cellular telecommunication network components displaying editable parameter values for a plurality of network components in accordance with embodiments described herein.
Figure 4B:
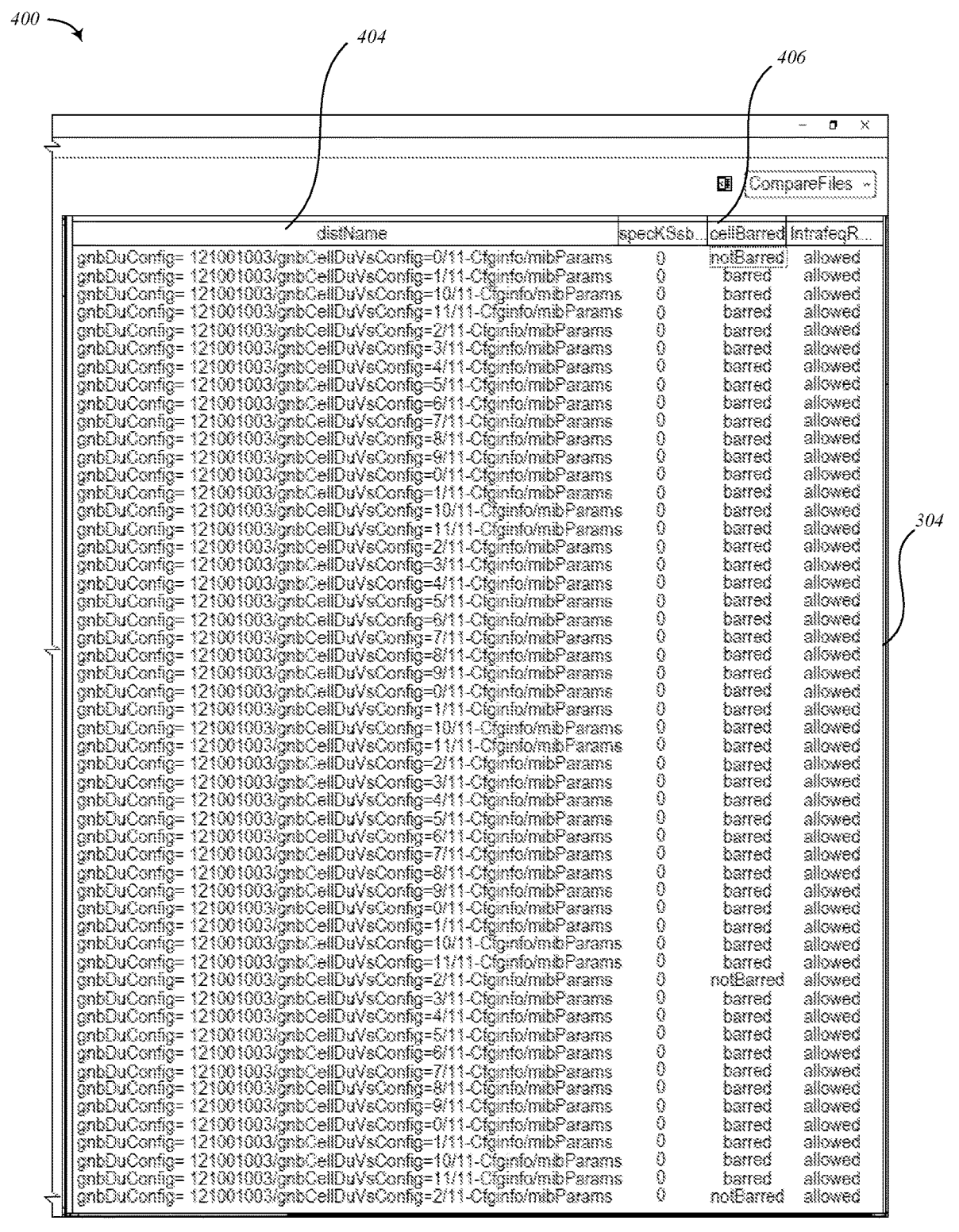

FIGS. 4A and 4B show an example GUI screen 400 of the system 100 for updating configuration of cellular telecommunication network components displaying editable parameter values for a plurality of network components in accordance with embodiments described herein.

Following the operations shown within the GUI screen 300 shown in FIG. 3, in the present example, the user may then select the "getallobjects" GUI element 402 to refresh the window 304 view so that all configurations of each DU network component (listed in column 404) are visible within a table for updating. In the present example embodiment, there may be two methods available to change the "CellBarred" 406 parameter values in the table shown in the window 304. The first method is that within the offline network component configuration GUI tool 208 the user may drag/select/copy column values within the table shown in the window 304 (e.g., using a mouse, keyboard or touch screen). The second method is that the user may export the table shown in the window 304 to an electronic spreadsheet, such as MS Excel® (e.g., by selecting the export user interface element 510) and then edit/paste from the clipboard into the spreadsheet. Other methods for updating the parameter values shown in the table in the window 304 may be used in various different embodiments.

Figure 5A:
FIG. 5A is a first portion of an example GUI screen of a system for updating configuration of cellular telecommunication network components displaying updated parameter values for a plurality of listed network components in accordance with embodiments described herein.
Figure 5B:
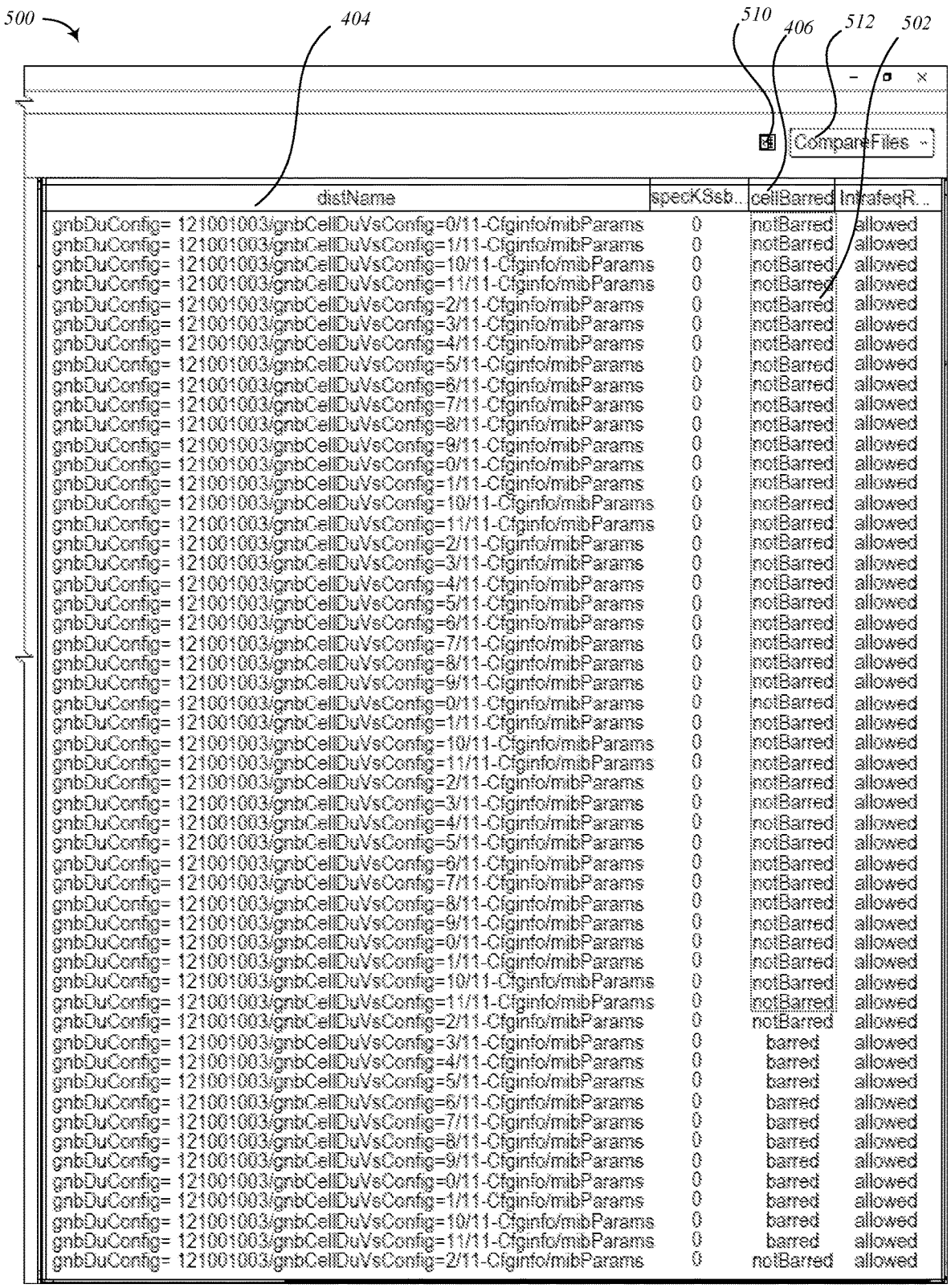
FIG. 5B is a second portion of the example GUI screen of FIG. 5A displaying updated parameter values for a plurality of listed network components in accordance with embodiments described herein.

FIGS. 5A and 5B show an example GUI screen 500 of the system 100 for updating configuration of cellular telecommunication network components displaying updated parameter values for a plurality of listed network components in accordance with embodiments described herein.

Following the operations shown within the GUI screen 400 shown in FIGS. 4A and 4B, in the present example, the user may update the "CellBarred" 406 parameter value to "notBarred" for multiple DUs (shown listed in column 404) in the table shown in the window 304 by first making sure the first cell in the selection list in the column containing the "CellBarred" 406 parameter values is set to "notBarred". The offline network component configuration GUI tool 208 enables the user to then select that first cell, hold down the left mouse button, drag down the mouse to select all the configurations for DUs the user would like to change, and then release the left mouse button. Then the user may left click anywhere in the selection and the "notBarred" value will be copied, thereby causing the "CellBarred" parameter value for each of the selected DUs 502 to be updated to "notBarred".

In an example embodiment, the "changes" tab is selectable by the user to observe the updates made by the user in the GUI screen 500 before committing the changes. In an example embodiment, there may also be a selectable GUI option (not shown) to revert back to a previous state before the changes to the network components were made. There may also be displayed a "files loaded" element selectable by the user to view the electronic files setting network component parameters 206 that were loaded by the offline network component configuration GUI tool 208. In various embodiments, a "searchObject" field 504 may also be displayed in which the user may enter text as one or more search terms to search for particular network objects extracted from the electronic files setting network component parameters 206 that were loaded by the offline network component configuration GUI tool 208. Also, in various embodiments, a "search Parameter" field 506 may also be displayed in which the user may enter text as one or more search terms to search for particular parameters associated with the network objects. After the offline network component configuration GUI tool 208 displays search results via use of the "searchObject" field 504 and/or the "search Parameter" field 506 showing a particular network object or parameter, the user may then select the desired network object or parameter and update such objects or parameters using the offline network component configuration GUI tool 208 as described herein. A "CompareFiles" selectable element 512 may be displayed that, when selected, may provide a visual comparison of the electronic files setting network component parameters 206 that were loaded by the offline network component configuration GUI tool 208 and the updated files setting network component parameters. For example, differences between parameters values and/or network objects may be highlighted or otherwise visually displayed as a result of the "CompareFiles" selectable element 512 being used.

Figure 6:
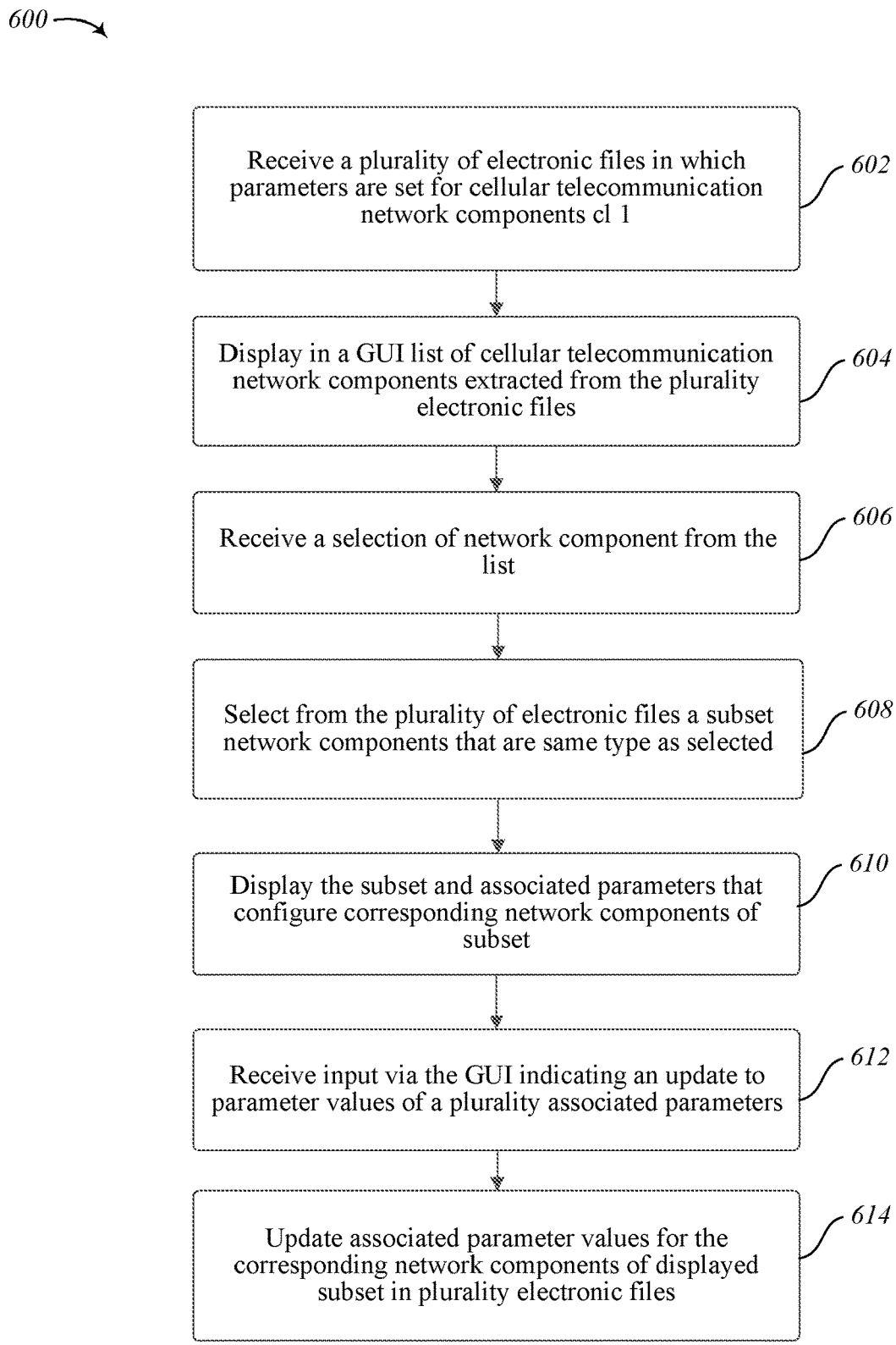
FIG. 6 illustrates a logical flow diagram showing an example embodiment of a process for updating associated parameter values for corresponding network components in accordance with embodiments described herein.

FIG. 6 illustrates a logical flow diagram 600 showing an example embodiment of a process for updating associated parameter values for corresponding network components in accordance with embodiments described herein.

At 602, the offline network component configuration GUI tool 208 receives a plurality of electronic files in which parameters are set for a plurality of cellular telecommunication network components of the cellular telecommunication network via an operation support system (OSS) of the cellular telecommunication network. In various embodiments, the plurality of cellular telecommunication network components of the cellular telecommunication network may include one or more of: centralized unit (CU) network components, distributed unit (CU) network components, CU user plane (CU-UP) network components, CU control plane (CU-CP) network components, cellular base station network components, Next Generation Node B (gNb) network components, 5G New Radio (5G NR) Radio Access Networks (RAN) network components, and network functions (NF). In an example embodiment, one or more of files the plurality of electronic files in which parameters are set for a plurality of cellular telecommunication network components are in a Yet Another Next Generation (YANG) data modeling language.

In various embodiments, the plurality of electronic files in which parameters are set for a plurality of cellular telecommunication network components are in different data modeling formats or different data modeling languages from each other. One or more of files the plurality of electronic files in which parameters are set for a plurality of cellular telecommunication network components are in a file format specific to a cellular network vendor of a mobile network operator (MNO) of the cellular telecommunication network.

At 604, the offline network component configuration GUI tool 208 electronically displays in a GUI a list of cellular telecommunication network components of different types extracted from the plurality of electronic files. In an example embodiment, the GUI is of a software application that performs the displaying on the GUI and the updating of associated network component parameter values offline. For example, in one embodiment, the software application is not connected online to the network 100 and/or the OSS 204 while performing updates to the plurality of electronic files.

At 606, the offline network component configuration GUI tool 208 electronically receives, via the GUI, a selection of a cellular telecommunication network component from the list of cellular telecommunication network components.

At 608, the offline network component configuration GUI tool 208 electronically selects from the plurality of electronic files a subset of the plurality of cellular telecommunication network components that are of a same type as the selected cellular telecommunication network component.

At 610, the offline network component configuration GUI tool 208 electronically displays on the GUI the subset of the plurality of cellular telecommunication network components and associated parameters that configure corresponding telecommunication network components of the displayed subset. In various example embodiments, the associated parameters that configure corresponding telecommunication network components of the displayed subset may include one or more of: CU level parameters, DU level parameters, parameters defined by 3GPP; and parameters defined by one or more cellular network vendors of a mobile network operator (MNO) of the cellular telecommunication network.

At 612, the offline network component configuration GUI tool 208 electronically receives input via the GUI indicating an update to parameter values of a plurality of the displayed associated parameters that configure corresponding telecommunication network components of the displayed subset.

At 614, the offline network component configuration GUI tool 208 electronically updates associated parameter values for the corresponding cellular telecommunication network components of the displayed subset in one or more of the plurality of electronic files based on the received input, via the GUI, indicating the update.

Figure 7:
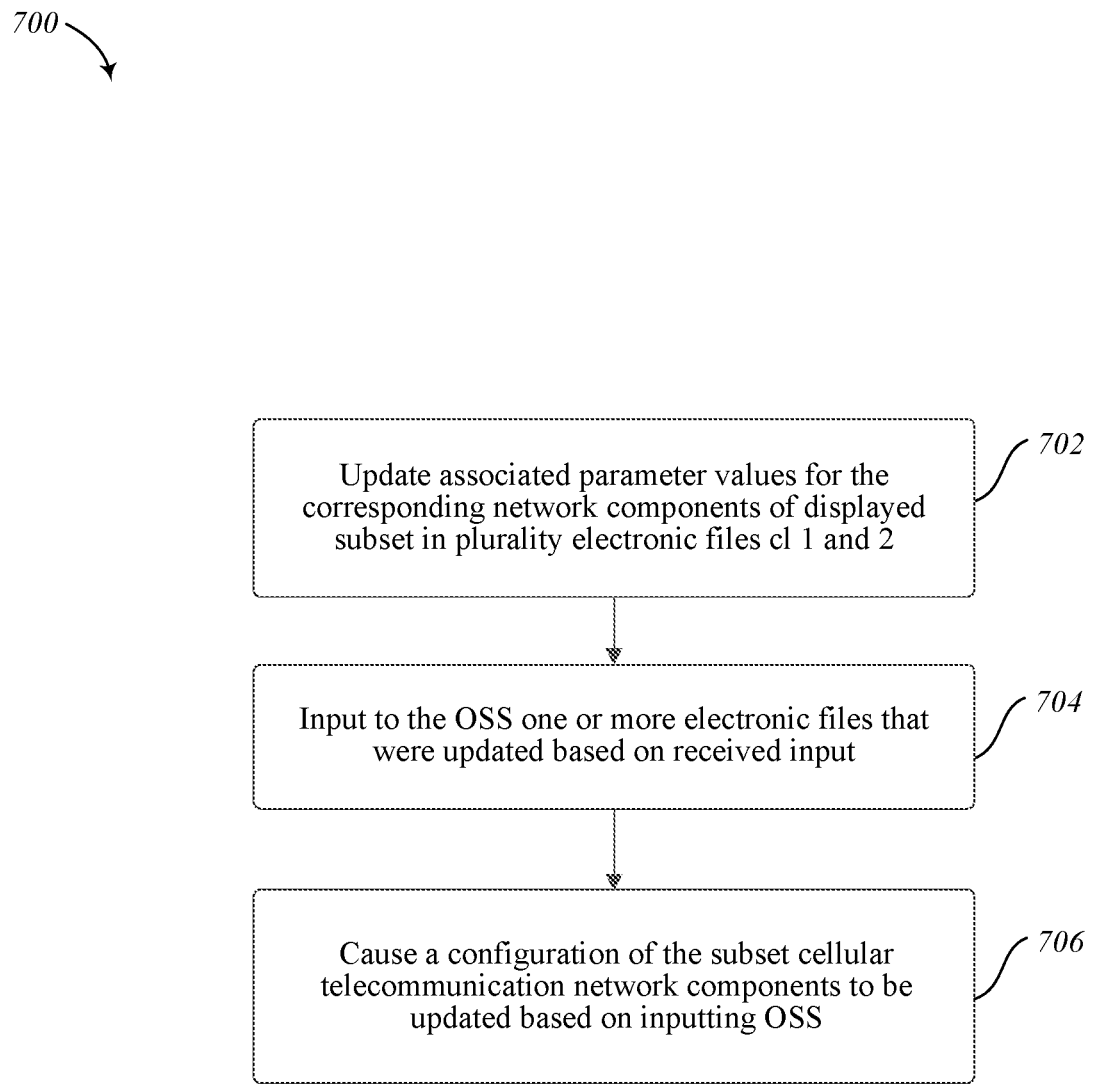
FIG. 7 illustrates a logical flow diagram showing an example embodiment of a process for updating configuration of cellular telecommunication network components in accordance with embodiments described herein.

FIG. 7 illustrates a logical flow diagram showing an example embodiment of a process 700 for updating configuration of cellular telecommunication network components in accordance with embodiments described herein. For example, the operations in process 700 may follow or be performed in conjunction with the operations of process 600 shown in FIG. 6.

At 702, the offline network component configuration GUI tool 208 electronically updates associated parameter values for the corresponding cellular telecommunication network components of a displayed subset of network components in one or more of the plurality of loaded electronic files based on the received input, via the GUI, indicating the update.

At 704, the offline network component configuration GUI tool 208 electronically inputs to the OSS the one or more electronic files that were updated based on the received input via the GUI indicating the update.

At 706, the offline network component configuration GUI tool 208 causes a configuration of the subset of the plurality of cellular telecommunication network components to be updated based on inputting to the OSS the one or more electronic files that were updated based on the received input.

Figure 8:
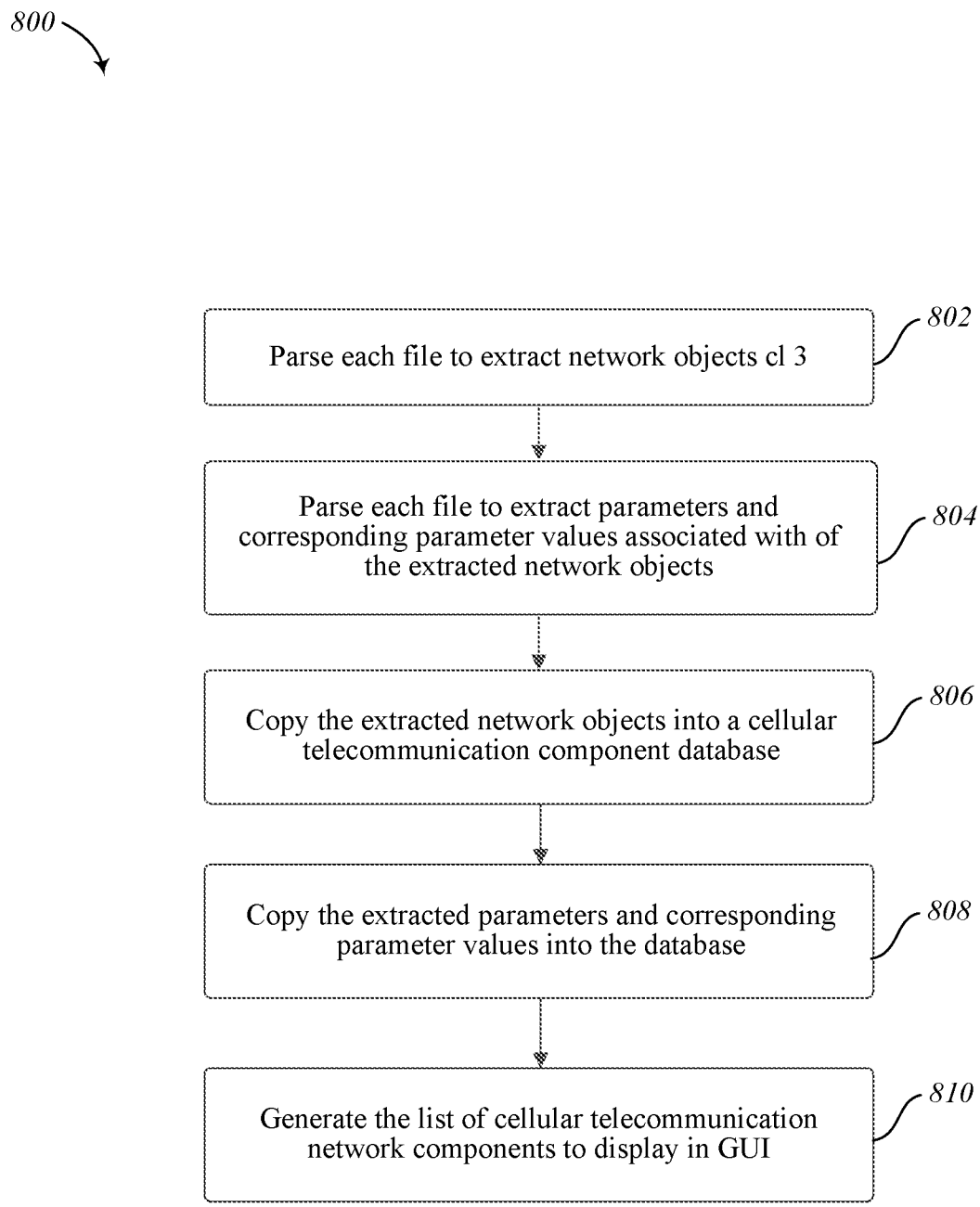
FIG. 8 illustrates a logical flow diagram showing an example embodiment of a process for generating a list of cellular telecommunication network components to display in a GUI in accordance with embodiments described herein.

FIG. 8 illustrates a logical flow diagram showing an example embodiment of a process 800 for generating a list of cellular telecommunication network components to display in a GUI in accordance with embodiments described herein. In an example embodiment, the operation of process 700 of electronically displaying in the GUI the list of cellular telecommunication network components of different types extracted from the plurality of electronic files may include performing the operations of process 800.

At 802, the offline network component configuration GUI tool 208 electronically parses each electronic file of the plurality of electronic files to extract, from the file, network objects defined in the file representing cellular telecommunication network components.

At 804, the offline network component configuration GUI tool 208 electronically parses each electronic file of the plurality of electronic files to extract, from the file, parameters and corresponding parameter values associated with each of the extracted network objects.

At 806, the offline network component configuration GUI tool 208 electronically copies the extracted network objects into a cellular telecommunication network component database. For example, the cellular telecommunication network component database may include a plurality of electronic spreadsheet files.

At 808, the offline network component configuration GUI tool 208 electronically copies the extracted parameters and corresponding parameter values associated with each of the extracted network objects into the cellular telecommunication network component database.

At 810, the offline network component configuration GUI tool 208 electronically generates the list of cellular telecommunication network components of different types to display in the GUI. In such instances, in an example embodiment, the operation in process 600 of electronically selecting from the plurality of electronic files a subset of the plurality of cellular telecommunication network components that are of a same type as the selected cellular telecommunication network component may include querying the cellular telecommunication network component database for network objects representing cellular telecommunication network components that are of the same type as the selected cellular telecommunication network component. Such results of the querying may then be provided to the GUI for display.

The process 800 may further include the offline network component configuration GUI tool 208 electronically organizing the extracted network objects and the extracted parameters into a tree structure representing cellular telecommunication network components, cellular telecommunication network sub-components and associated parameters in the in the tree structure. The offline network component configuration GUI tool 208 may then display in the GUI the tree structure in a navigable format as the list of cellular telecommunication network components. The selection of the cellular telecommunication network component may then be from the displayed tree structure.

Figure 9:
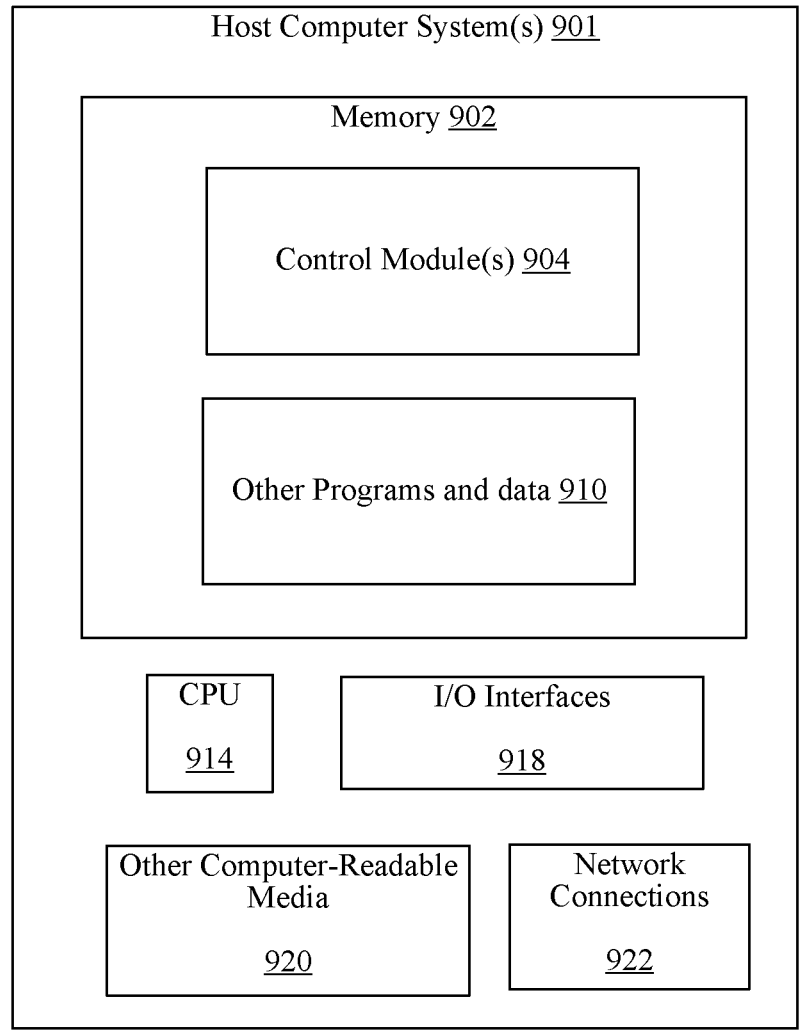
FIG. 9 shows a system diagram that describes an example implementation of a computing system(s) for implementing embodiments described herein.

FIG. 9 shows a system diagram that describes an example implementation of a computing system(s) for implementing embodiments described herein.

The functionality described herein for updating configuration of cellular telecommunication network components can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 9 illustrates an example of underlying hardware on which such software and functionality may be hosted and/or implemented.

In particular, shown is example host computer system(s) 901. For example, such computer system(s) 901 may represent one or more of those in various data centers, base stations and cell sites shown and/or described herein that are, or that host or implement the functions of: the offline network component configuration GUI tool 208, routers, components, microservices, nodes, node groups, control planes, clusters, virtual machines, NFs, and other aspects described herein for updating configuration of cellular telecommunication network components. In some embodiments, one or more special-purpose computing systems may be used to implement the functionality described herein. Accordingly, various embodiments described herein may be implemented in software, hardware, firmware, or in some combination thereof. Host computer system(s) 901 may include memory 902, one or more central processing units (CPUs) 914, I/O interfaces 918, other computer-readable media 920, and network connections 922.

Memory 902 may include one or more various types of non-volatile and/or volatile storage technologies. Examples of memory 902 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 902 may be utilized to store information, including computer-readable instructions that are utilized by CPU 914 to perform actions, including those of embodiments described herein.

Memory 902 may have stored thereon control module(s) 904. The control module(s) 904 may be configured to implement and/or perform some or all of the functions of the systems, components and modules described herein for updating configuration of cellular telecommunication network components. Memory 902 may also store other programs and data 910, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 922 are configured to communicate with other computing devices to facilitate the functionality described herein. In various embodiments, the network connections 922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 918 may include a video interfaces, other data input or output interfaces, or the like. Other computer-readable media 920 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for updating configuration of cellular telecommunication network components in a cellular telecommunication network, the method comprising:
   receiving a plurality of electronic files in which parameters are set for a plurality of cellular telecommunication network components of the cellular telecommunication network via an operation support system (OSS) of the cellular telecommunication network;
   electronically displaying in a graphical user interface (GUI) a list of cellular telecommunication network components of different types extracted from the plurality of electronic files;
   electronically receiving, via the GUI, a selection of a cellular telecommunication network component from the list of cellular telecommunication network components;
   electronically selecting from the plurality of electronic files a subset of the plurality of cellular telecommunication network components that are of a same type as the selected cellular telecommunication network component;
   electronically displaying on the GUI the subset of the plurality of cellular telecommunication network components and associated parameters that configure corresponding telecommunication network components of the displayed subset;
   electronically receiving input via the GUI indicating an update to parameter values of a plurality of the displayed associated parameters that configure corresponding telecommunication network components of the displayed subset; and
   electronically updating associated parameter values for the corresponding cellular telecommunication network components of the displayed subset in one or more of the plurality of electronic files based on the received input, via the GUI, indicating the update.

2. The method of claim 1, further comprising:
   electronically inputting to the OSS the one or more electronic files that were updated based on the received input; and
   causing a configuration of the subset of the plurality of cellular telecommunication network components to be updated based on inputting to the OSS the one or more electronic files that were updated based on the received input.

3. The method of claim 2 wherein the electronically displaying in the GUI the list of cellular telecommunication network components of different types extracted from the plurality of electronic files includes:
   electronically parsing each electronic file of the plurality of electronic files to extract, from the file, network objects defined in the file representing cellular telecommunication network components;
   electronically parsing each electronic file of the plurality of electronic files to extract, from the file, parameters and corresponding parameter values associated with each of the extracted network objects;
   electronically copying the extracted network objects into a cellular telecommunication network component database; and
   electronically copying the extracted parameters and corresponding parameter values associated with each of the extracted network objects into the cellular telecommunication network component database; and
   electronically generating the list of cellular telecommunication network components of different types to display in the GUI.

4. The method of claim 3 wherein the cellular telecommunication network component database includes a plurality of electronic spreadsheet files.

5. The method of claim 3 wherein the electronically selecting from the plurality of electronic files a subset of the plurality of cellular telecommunication network components that are of a same type as the selected cellular telecommunication network component includes:
   querying the cellular telecommunication network component database for network objects representing cellular telecommunication network components that are of the same type as the selected cellular telecommunication network component; and
   providing results of the querying to the GUI.

6. The method of claim 3 wherein the electronically displaying in the GUI a list of cellular telecommunication network components of different types extracted from the plurality of electronic files further includes:
   electronically organizing the extracted network objects and the extracted parameters into a tree structure representing cellular telecommunication network components, cellular telecommunication network sub-components and associated parameters in the in the tree structure;

displaying in the GUI the tree structure in a navigable format as the list of cellular telecommunication network components and wherein the selection of the cellular telecommunication network component is from the displayed tree structure.

7. The method of claim 1 wherein the plurality of cellular telecommunication network components of the cellular telecommunication network includes one or more of: centralized unit (CU) network components, distributed unit (CU) network components, CU user plane (CU-UP) network components, CU control plane (CU-CP) network components, cellular base station network components, Next Generation Node B (gNb) network components, 5G New Radio (5G NR) Radio Access Networks (RAN) network components, and network functions (NF).

8. The method of claim 1 wherein the associated parameters that configure corresponding telecommunication network components of the displayed subset include one or more of: CU level parameters, DU level parameters, parameters defined by 3GPP; and parameters defined by one or more cellular network vendors of a mobile network operator (MNO) of the cellular telecommunication network.

9. The method of claim 1 wherein the plurality of electronic files in which parameters are set for a plurality of cellular telecommunication network components are in different data modeling formats or different data modeling languages from each other.

10. The method of claim 1 wherein one or more of files the plurality of electronic files in which parameters are set for a plurality of cellular telecommunication network components are in a file format specific to a cellular network vendor of a mobile network operator (MNO) of the cellular telecommunication network.

11. The method of claim 1 wherein one or more of files the plurality of electronic files in which parameters are set for a plurality of cellular telecommunication network components are in a Yet Another Next Generation (YANG) data modeling language.

12. The method of claim 1 wherein the GUI is of a software application that performs the displaying on the GUI and the updating of the associated parameter values offline.

13. A system for updating configuration of cellular telecommunication network components in a cellular telecommunication network, the system comprising:
  at least one memory that stores computer executable instructions; and
  at least one processor that executes the computer executable instructions to cause actions to be performed, the actions including:
    receiving a plurality of electronic files in which parameters are set for a plurality of cellular telecommunication network components of the cellular telecommunication network via an operation support system (OSS) of the cellular telecommunication network;
    electronically displaying in a graphical user interface (GUI) a list of cellular telecommunication network components of different types extracted from the plurality of electronic files;
    electronically receiving, via the GUI, a selection of a cellular telecommunication network component from the list of cellular telecommunication network components;
    electronically selecting from the plurality of electronic files a subset of the plurality of cellular telecommunication network components that are of a same type as the selected cellular telecommunication network component;
    electronically displaying on the GUI the subset of the plurality of cellular telecommunication network components and associated parameters that configure corresponding telecommunication network components of the displayed subset;
    electronically receiving input via the GUI indicating an update to parameter values of a plurality of the displayed associated parameters that configure corresponding telecommunication network components of the displayed subset; and
    electronically updating associated parameter values for the corresponding telecommunication network components of the displayed subset in one or more of the plurality of electronic files based on the received input, via the GUI, indicating the update.

14. The system of claim 13, wherein the actions further include:
  electronically inputting to the OSS the one or more electronic files that were updated based on the received input; and
  causing a configuration of the subset of the plurality of cellular telecommunication network components to be updated based on inputting to the OSS the one or more electronic files that were updated based on the received input.

15. The system of claim 13 wherein the electronically displaying in the GUI the list of cellular telecommunication network components of different types extracted from the plurality of electronic files includes:
  electronically parsing each electronic file of the plurality of electronic files to extract, from the file, network objects defined in the file representing cellular telecommunication network components;
  electronically parsing each electronic file of the plurality of electronic files to extract, from the file, parameters and corresponding parameter values associated with each of the extracted network objects;
  electronically copying the extracted network objects into a cellular telecommunication network component database; and
  electronically copying the extracted parameters and corresponding parameter values associated with each of the extracted network objects into the cellular telecommunication network component database; and
  electronically generating the list of cellular telecommunication network components of different types to display in the GUI.

16. The system of claim 15 wherein the cellular telecommunication network component database includes a plurality of electronic spreadsheet files.

17. A non-transitory computer-readable storage medium having computer-executable instructions stored thereon that, when executed by at least one processor, cause the at least one processor to cause actions to be performed, the actions including:
  receiving, by a system for updating configuration of cellular telecommunication network components in a cellular telecommunication network, a plurality of electronic files in which parameters are set for a plurality of cellular telecommunication network components of the cellular telecommunication network via an operation support system (OSS) of the cellular telecommunication network;

electronically displaying in a graphical user interface (GUI) a list of cellular telecommunication network components of different types extracted from the plurality of electronic files;

electronically receiving, via the GUI, a selection of a cellular telecommunication network component from the list of cellular telecommunication network components;

electronically selecting from the plurality of electronic files a subset of the plurality of cellular telecommunication network components that are of a same type as the selected cellular telecommunication network component;

electronically displaying on the GUI the subset of the plurality of cellular telecommunication network components and associated parameters that configure corresponding telecommunication network components of the displayed subset;

electronically receiving input via the GUI indicating an update to parameter values of a plurality of the displayed associated parameters that configure corresponding telecommunication network components of the displayed subset; and electronically updating associated parameter values for the corresponding telecommunication network components of the displayed subset in one or more of the plurality of electronic files based on the received input, via the GUI, indicating the update.

18. The non-transitory computer-readable storage medium of claim 17, wherein the actions further include:

electronically inputting to the OSS the one or more electronic files that were updated based on the received input; and causing a configuration of the subset of the plurality of cellular telecommunication network components to be updated based on inputting to the OSS the one or more electronic files that were updated based on the received input.

19. The non-transitory computer-readable storage medium of claim 17 wherein the electronically displaying in the GUI the list of cellular telecommunication network components of different types extracted from the plurality of electronic files includes:

electronically parsing each electronic file of the plurality of electronic files to extract, from the file, network objects defined in the file representing cellular telecommunication network components;

electronically parsing each electronic file of the plurality of electronic files to extract, from the file, parameters and corresponding parameter values associated with each of the extracted network objects;

electronically copying the extracted network objects into a cellular telecommunication network component database; and electronically copying the extracted parameters and corresponding parameter values associated with each of the extracted network objects into the cellular telecommunication network component database; and electronically generating the list of cellular telecommunication network components of different types to display in the GUI.

20. The non-transitory computer-readable storage medium of claim 19 wherein the cellular telecommunication network component database includes a plurality of electronic spreadsheet files.

* * * * *